United States Patent [19]
Collins et al.

[11] Patent Number: 6,066,066
[45] Date of Patent: *May 23, 2000

[54] THRUST BEARING BULKHEAD IN A TRANSMISSION OF A MOTOR VEHICLE

[75] Inventors: John C. Collins, Novi; Berthold Martin, Shelby Township; Craig M. Renneker, Auburn Hills; Charles K. Streetman, Sterling Heights, all of Mich.

[73] Assignee: DaimlerChrysler Corporation, Auburn Hills, Mich.

[*] Notice: This patent is subject to a terminal disclaimer.

[21] Appl. No.: 09/282,383

[22] Filed: Mar. 31, 1999

[51] Int. Cl.⁷ .............................. F16H 3/62; F16H 57/02
[52] U.S. Cl. ........................ 475/331; 475/279; 475/281; 74/606 R
[58] Field of Search ................................ 475/275, 276, 475/279, 280, 277, 288, 331, 346; 384/619, 613; 403/DIG. 7; 74/606 R

[56] References Cited

U.S. PATENT DOCUMENTS

| | | | |
|---|---|---|---|
| 2,544,631 | 3/1951 | Heimann et al. | 411/518 |
| 3,752,010 | 8/1973 | Tipping | 475/81 |
| 4,263,823 | 4/1981 | Numazawa et al. | 475/59 |
| 4,387,607 | 6/1983 | Sakakibara | 475/331 X |
| 4,674,360 | 6/1987 | Matoba | 475/335 |
| 4,722,240 | 2/1988 | Frederick et al. | 74/450 |
| 4,730,517 | 3/1988 | Hamano et al. | 475/331 |
| 4,875,391 | 10/1989 | Leising et al. | 477/155 |
| 4,944,193 | 7/1990 | Harada et al. | 475/331 |
| 5,083,992 | 1/1992 | Asada | 475/288 X |
| 5,525,117 | 6/1996 | Morisawa et al. | 74/606 R X |
| 5,533,945 | 7/1996 | Martin et al. | 475/280 X |
| 5,647,816 | 7/1997 | Michioka et al. | 475/331 X |
| 5,876,300 | 3/1999 | Moroto et al. | 475/275 |

*Primary Examiner*—Charles A Marmor
*Assistant Examiner*—Ankur Parekh
*Attorney, Agent, or Firm*—Marc Lorelli

[57] ABSTRACT

The present invention relates to a transmission for an automotive vehicle having a clutch retainer assembly or thrust bulkhead fixedly secured to the transmission housing and interdisposed between the reverse clutch assembly and the fourth clutch assembly. A pair of thrust bearing assemblies are interdisposed between the clutch assemblies and the thrust bulkhead to transfer the axial thrust loads generated by the multiple planetary gear assemblies through the thrust bulkhead to the transmission housing.

17 Claims, 3 Drawing Sheets

THRUST BEARING BULKHEAD IN A TRANSMISSION OF A MOTOR VEHICLE

BACKGROUND OF THE INVENTION

1. Technical Field

The present invention generally pertains to an automatic transmission for a motor vehicle. More specifically, but without restriction to the particular embodiment or use which is shown and described for purposes of illustration, the present invention relates to a bulkhead assembly fixedly secured to the transmission housing and interdisposed between a planetary gear set and the oil pump for reacting thrust loads generated by the planetary gear set.

2. Description Of The Related Art

A conventional automatic transmission includes a hydrodynamic torque converter to transfer engine torque from an engine crank shaft to a rotatable input member of the transmission through fluid-flow forces. The transmission also includes frictional units, typically referred to as clutches or brakes, which couple the rotatable input member to a member of a planetary gear assembly or hold a member of the planetary gear set stationary during the transmission of power. Such automatic transmissions typically provide for multiple planetary gear sets in order to provide various ratios of torque and to ensure that the available torque and the respective tractive power demand are matched.

In an effort to further optimize the automatic transmission and minimize the weight thereof, various components which were previously fabricated from steel are being fabricated from lighter weight materials such as aluminum. While the use of such materials can significantly reduce the weight of components within the transmission, these components do not possess the same strength of materials properties as steel. As such, components made from alternate materials may be incapable of supporting and reacting certain internal loads generating during extreme operating conditions.

As an example, significant axial or thrust loads are generated by the various planetary gear sets during the operation of the automatic transmission. These thrust loads are transmitted and reacted through various components, such as the oil pump, in the automatic transmission. The continuous normal-use loading, as well as certain extreme operating conditions, such as the full torque converter stall condition, may be sufficient to ultimately cause failure of such components.

SUMMARY OF THE INVENTION

It is a general object of the present invention to provide a four-speed automatic transmission for an automotive vehicle.

It is another object of the present invention to provide a four-speed automatic transmission capable of efficiently reacting internal loads generated by the components of the transmission.

It is a further object of the present invention to provide an automatic transmission having a bulkhead assembly interdisposed between the planetary gear sets and the oil pump for reacting axial thrust loads generated by the planetary gear set.

To achieve the foregoing objects, the present invention is a four-speed automatic transmission for a vehicle including a transmission housing, an input member, an output member, a plurality of planetary gear sets for changing a ratio of torque between the input member and the output member, a plurality of clutch members to selectively couple the input member to the planetary gear sets or alternately coupled the planetary gear sets to the transmission housing. A thrust bulkhead is fixedly secured to the transmission housing and interdisposed between a planetary gear set and an oil pump. A plurality of thrust bearing assemblies are interdisposed between the planetary gear set, the thrust bulkhead, and the clutch assembly for reacting the thrust loads generated by the planetary gear sets.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
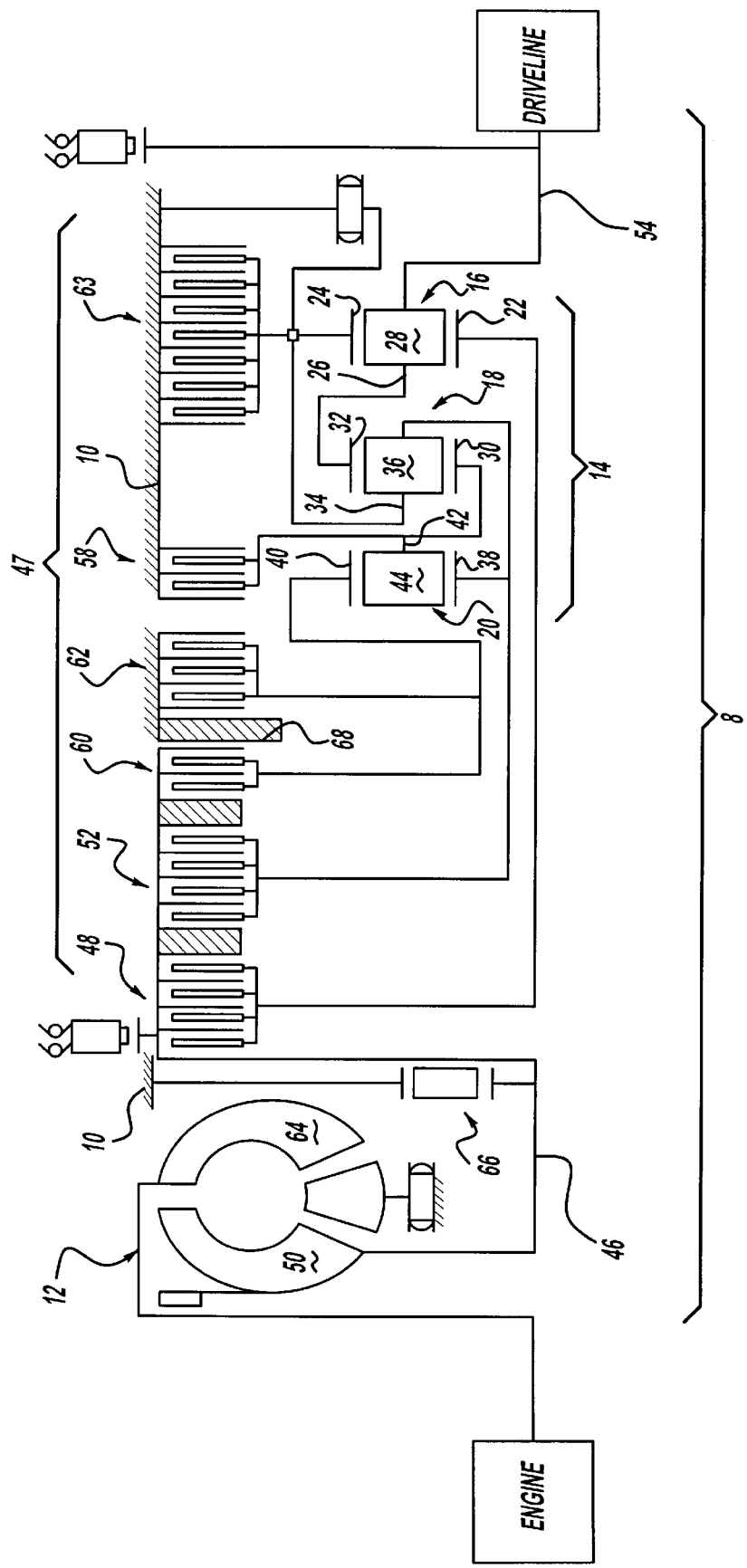
FIG. 1 is a schematic representation of a transmission of a motor vehicle in accordance with the teaching of a preferred embodiment of the present invention.
Figure 2:
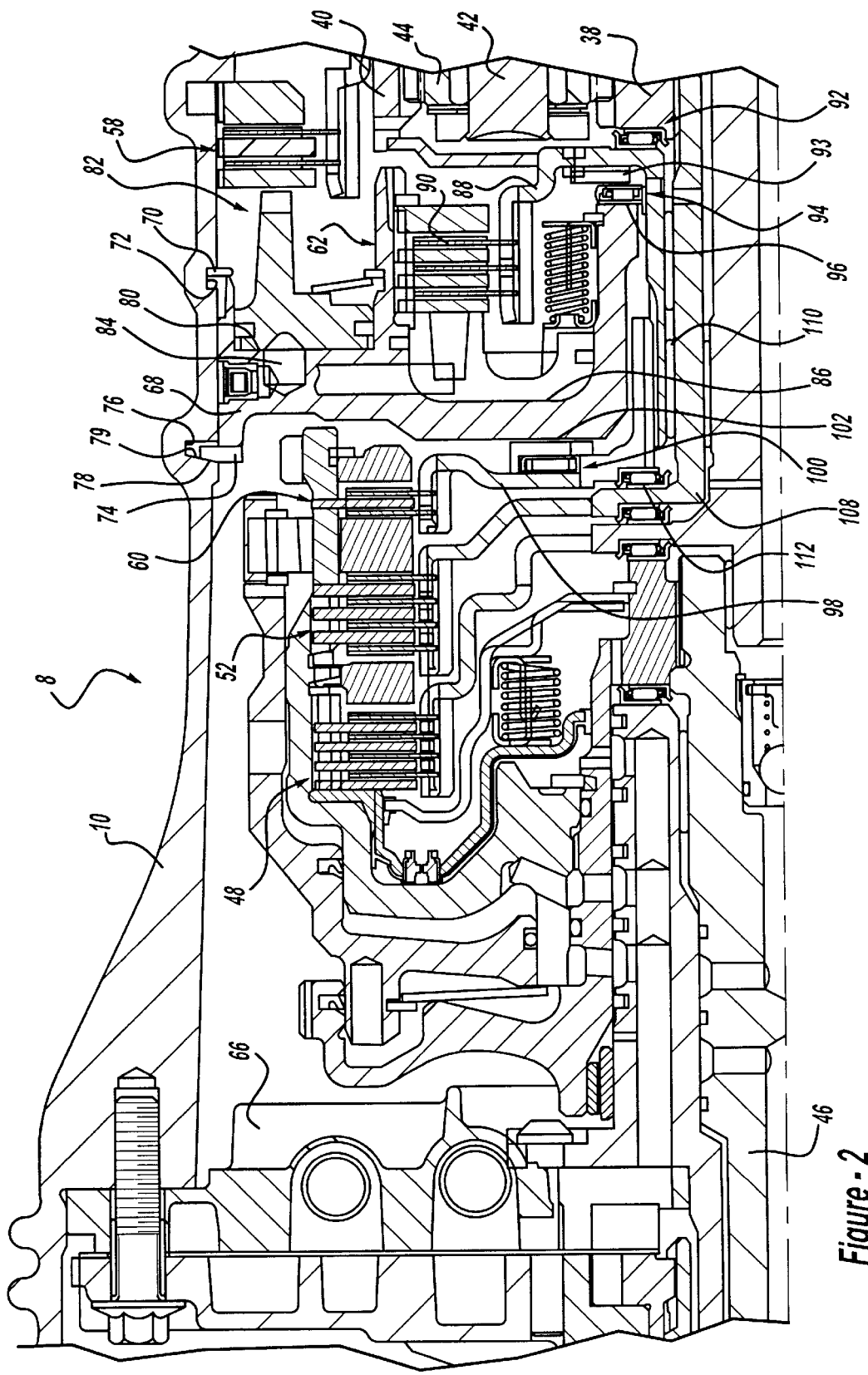
FIG. 2 is an enlarged cross-sectional view of the thrust bearing bulkhead assembly of the present invention.
Figure 3:
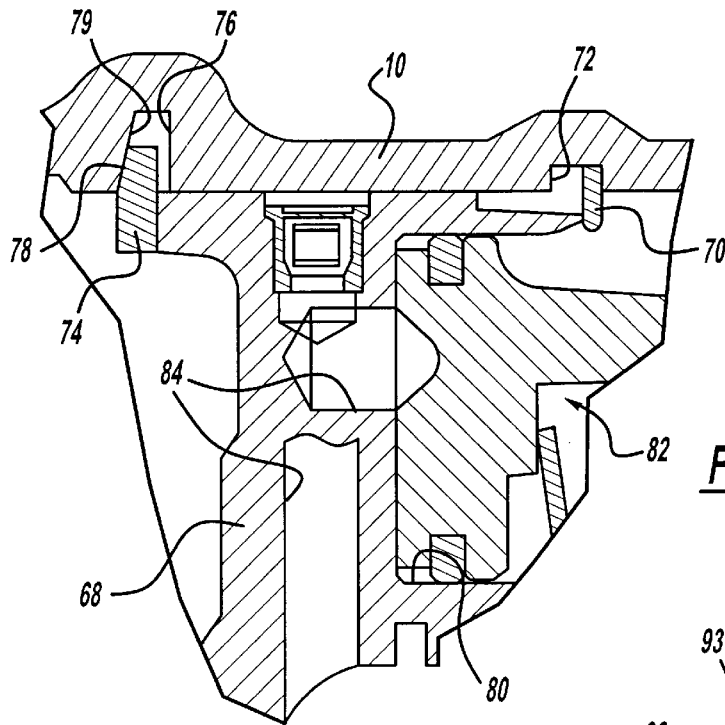
FIG. 3 is a detailed view of the interconnection between the bulkhead and the transmission housing.
Figure 4:
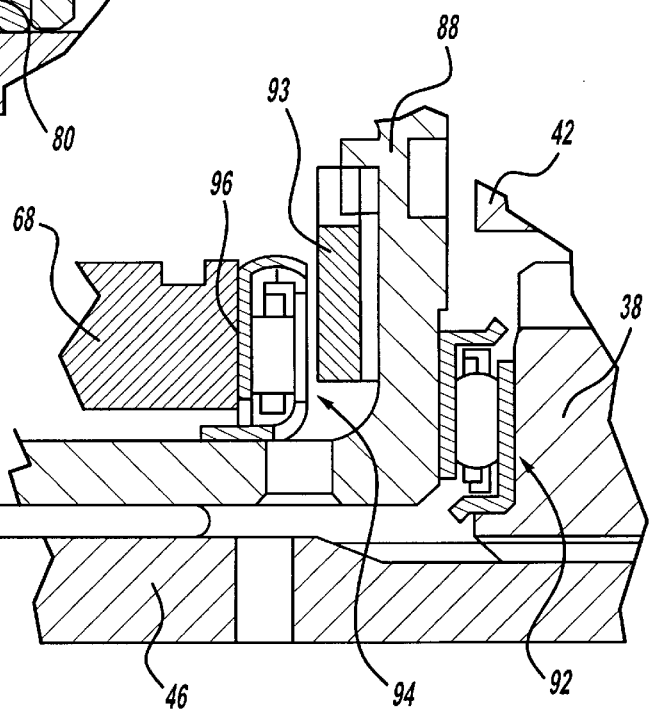
FIG. 4 is a detailed view of the interface between the bulkhead and the third planetary gear set.

With reference to FIG. 1, a four-speed automatic transmission 8 is shown according to the principles of the present invention. The automatic transmission 8 includes a housing 10 enclosing a torque converter 12 which is operably connected to a multiple planetary gear system 14. Multiple planetary gear system 14 includes a first planetary gear assembly 16, a second planetary gear assembly 18, and a third planetary gear assembly 20. The first planetary gear assembly 16 includes a sun gear 22, an annulus gear 24, a planetary carrier 26 and a plurality of planetary gears 28 rotatably mounted to planetary carrier 26. The second planetary gear assembly 18 includes a sun gear 30, an annulus gear 32, a planetary carrier 34 and a plurality of planetary gears 36 rotatably mounted on planetary carrier 34. The third planetary gear assembly 20 includes a sun gear 38, an annulus gear 40, a planetary carrier 42 and a plurality of planetary gears 44 rotatably mounted on planetary carrier 42.

Input shaft 46 which is driven by a turbine 50 of torque converter 12 selectively drives sun gear 22 of the first planetary gear assembly 16 upon engagement of an underdrive clutch mechanism 48. Annulus gear 24 of first planetary gear assembly 16 is attached to planetary carrier 34 of second planetary gear assembly 18 which is also attached to sun gear 38 of third planetary gear assembly 20. Each of these elements may be operably coupled by an overdrive clutch mechanism 52 which when engaged operably couples annulus gear 24 of first planetary gear assembly 16, carrier assembly 34 of second planetary gear assembly 18, and sun gear 38 of third planetary gear assembly 20 to input shaft 46.

Planetary carrier 26 of first planetary gear assembly 16 is operably coupled to an output shaft 54 and is also coupled to annulus gear 32 of second planetary gear assembly 18. Sun gear 30 of second planetary gear assembly 18 is coupled to planetary carrier 42 of third planetary gear assembly 20 which is engageable by a second gear clutch mechanism 58 to prevent rotation of carrier 42 and sun gear 30 relative to transmission housing 10. Annulus gear 40 of third planetary gear assembly 20 is engageable by a reverse clutch mechanism 60 for selectively engaging annulus gear 40 with input shaft 46. In addition, annulus gear 40 of third planetary gear assembly 20 is also engageable with a fourth gear clutch mechanism 62 for preventing rotation of annulus gear 40 relative to transmission housing 10.

In this manner, input shaft 46 is operably coupled to output shaft 54 through multiple planetary gear system 14. Multiple clutch system 47 including underdrive clutch mechanism 48, overdrive clutch mechanism 52, second gear clutch mechanism 58, reverse clutch mechanism 60, fourth gear clutch mechanism 62 and low-reverse clutch mechanism 63 are operable to selectively engage multiple planetary gear system 14 for driving output shaft 54 at various predetermined drive ratios. Torque converter 12 includes an impeller 64 in order to achieve torque multiplication, as is well known in the art. Oil pump assembly 66 is operably coupled to input shaft 46 to energize the hydraulic fluid present in automatic transmission 8 for lubricating the components thereof and for providing hydraulic pressure for actuation of the various clutch assemblies thereof.

As presently preferred, automatic transmission 8 includes a thrust bulkhead or clutch retainer assembly 68 fixedly secured to housing 10 and interdisposed between reverse clutch mechanism 60 and fourth gear clutch mechanism 62 for reacting axial thrust loads generated by multiple planetary gear system 14. In this manner, the axial thrust loads are grounded to transmission housing 10 and not transmitted through input shaft 46 to oil pump assembly 66.

Referring now to FIGS. 2 through 5, further details of clutch retainer assembly 68 are illustrated. Clutch retainer assembly 68 is axially aligned and fixedly secured within transmission housing 10 by first retainer ring 70 disposed within groove 72 formed in housing 10 and second retainer ring 74 disposed within groove 76 formed in housing 10. Second retainer ring 74 has a radially tapered face 78 which cooperates with a radially tapered surface 79 of groove 76 for axially biasing clutch retainer assembly 68 toward retainer ring 70. As such, retainer rings 70, 74 provides means for fixedly securing clutch retainer assembly 68 within transmission housing 10.

An outer annular groove 80 is formed in a rear face of thrust bulkhead 68 and is adapted to receive clutch piston assembly 82 of second gear clutch mechanism 58. A hydraulic fluid passageway 84 is formed in clutch retainer assembly 68 to provide fluid actuation of second clutch piston assembly 82. Inner annular groove 86 is formed in the rear face of clutch retainer assembly 68 and adapted to receive fourth gear clutch mechanism 62. A fourth clutch hub 88 is selectively driven by input shaft 46 and extends radially outwardly and axially into inner annular groove 86 such that clutch disks 90 cooperate with fourth gear clutch mechanism 62.

Needle thrust bearing assembly 92 is operably disposed between third sun gear 38 and fourth clutch hub 88 for transmitting axial thrust generated by multiple planetary gear system 14 to fourth clutch hub 88. One skilled in the art will understand that multiple planetary gear system 14 includes needle thrust bearing assemblies similar to needle thrust bearing assembly 92 for transmitting thrust loads generated thereby. More specifically, needle thrust bearing assemblies are interdisposed between sun gear 38 and sun gear 30, sun gear 30 and carrier 34, carrier 34 and sun gear 22, and sun gear 22 and output shaft 54. Needle thrust bearing assembly 94 is operably disposed between fourth clutch hub 88 and an annular bearing surface 96 formed on thrust bulkhead 68. An intermediate race portion 93 is interdisposed between fourth clutch hub 88 and bearing assembly 94. Needle thrust bearing assembly 94 transmits axial load from fourth clutch hub 88 to thrust bulkhead 68 which is fixedly secured to transmission housing 10. As such, a substantial portion of the axial load generated by multiple planetary gear system 14 is grounded to transmission housing 10 by thrust bulkhead 68.

Figure 5:
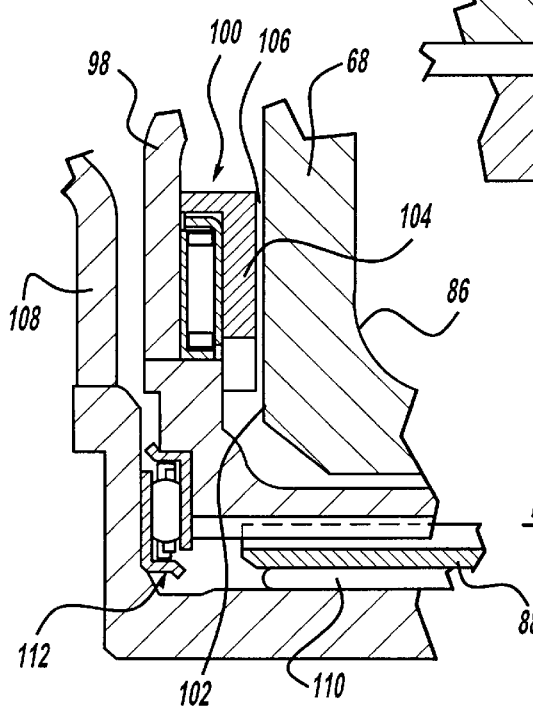
FIG. 5 is a detailed view of the interface between the bulkhead and the reverse clutch assembly.

Reverse clutch mechanism 60 includes reverse clutch hub 98 disposed adjacent a forward face of thrust bulkhead 68 and operably coupled to fourth clutch hub 88. A needle thrust bearing assembly 100 is interdisposed between reverse clutch hub 98 and annular bearing surface 102 formed on a rear face of thrust bulkhead 68. More specifically, needle thrust bearing assembly 100 has an intermediate race portion 104 interdisposed between bearing assembly 100 and annular bearing surface 102. As best seen in FIG. 5, a clearance 106 is provided between intermediate race portion 104 and annular bearing surface 102 under normal loading conditions. During normal operation, axial loading from multiple planetary gear system 14 is reacted entirely by thrust bulkhead 68. However, when transmission 8 experiences high loading conditions such as during full torque stall condition, the axial load generated by multiple planetary gear system 14 exceeds a given load, thereby causing thrust bulkhead 68 to engage intermediate race portion 104 for limiting further deflection of thrust bulkhead 68. Overdrive clutch mechanism 52 includes an overdrive clutch hub 108 disposed adjacent reverse clutch hub 98. Fourth clutch hub 88 is rotatably supported by bearing 110 on overdrive clutch hub 108. A needle thrust bearing assembly 112 is interdisposed between overdrive clutch hub 108 and reverse clutch hub 98.

During operation of automatic transmission 8, first, second and third planetary gear assemblies 16, 18, 20 generate axial thrust loads. For example, when automatic transmission 8 is in first gear, the torque of input shaft 46 is transmitted through underdrive clutch mechanism 48 and directed to first planetary gear assembly 16 which is operably coupled to output shaft 54. As a result, axial thrust loads generated by first planetary gear assembly 16 is transmitted through sun gear 22, sun gear 30 and sun gear 38 to fourth clutch hub 88. As a result of this axial loading, fourth clutch hub 88, and more specifically intermediate race portion 93, engages needle thrust bearing assembly 94. These axial thrust loads are grounded to transmission housing 10 through thrust bulkhead 68. Similar axial thrust loading conditions are generated in transmission 8 when the various drive ratios (i.e., second gear, third gear and overdrive) are engaged. As presently preferred, thrust bulkhead 68 is adequately dimensioned to react substantially all of the axial thrust loads generated by multiple planetary gear system 14 during normal operating conditions. Thus, thrust bulkhead 68 provides a primary means for reacting the axial thrust load generated by multiple planetary gear system 14. Occasionally, automatic transmission 8 experiences extreme loading conditions such as the loads generated during a full torque stall condition. In such extreme loading conditions, a majority of the axial thrust load generated by multiple planetary gear system 14 is reacted through thrust bulkhead 68. However, needle thrust bearing assembly 112 provides a secondary means for reacting the axial thrust load generated by multiple planetary gear system 14.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teaching of the invention without departing from the essential scope thereof. Therefore it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In an automatic transmission of the type having a transmission housing, an input shaft rotatably supported in the transmission housing, an output shaft rotatably supported in the transmission housing, a planetary gear assembly coupling the input shaft to the output shaft, a clutch assembly operable to selectively engage the planetary gear assembly for driving the output shaft at a drive ratio, the improvement comprising a thrust bulkhead secured to the transmission housing and extending radially inwardly therefrom, a first thrust bearing assembly operably disposed between the planetary gear assembly and the thrust bulkhead such that an axial thrust load generated by the planetary gear assembly is transmitted through the first thrust bearing assembly to the thrust bulkhead, a second thrust bearing assembly operably disposed between the thrust bulkhead and the clutch assembly, and a clearance being provided between the thrust bulkhead and the second thrust bearing assembly such that the thrust bulkhead engages the second thrust bearing assembly only when the axial thrust load generated by the planetary gear assembly exceeds a given load.

2. The automatic transmission of claim 1 wherein the first thrust bearing assembly engages a first annular bearing surface formed on a first face of the thrust bulkhead.

3. The automatic transmission of claim 1 wherein the clutch assembly includes a clutch hub extending between the planetary gear assembly and the thrust bulkhead, the first thrust bearing assembly being interdisposed between the clutch hub and the thrust bulkhead, and a third thrust bearing assembly being interdisposed between the planetary gear assembly and the clutch hub.

4. The automatic transmission of claim 3 further comprising an intermediate race portion extending from the clutch hub and engaging the first thrust bearing assembly.

5. The automatic transmission of claim 1 wherein the clutch assembly further comprises a clutch mechanism disposed within an annular groove formed in the thrust bulkhead and operable to selectively couple the planetary gear assembly to the thrust bulkhead.

6. The automatic transmission of claim 5 wherein the thrust bulkhead has a hydraulic fluid passageway formed therein to provide fluid communication between a hydraulic pump assembly and the clutch mechanism for actuation thereof.

7. The automatic transmission of claim 1 wherein the second thrust bearing assembly is engageable with a second annular bearing surface formed on a second face of the thrust bulkhead opposite the first face.

8. The automatic transmission of claim 1 further comprising an intermediate race portion interdisposed between the second thrust bearing assembly and the thrust bulkhead.

9. The automatic transmission of claim 1 wherein the transmission housing has a first groove formed therein for receiving a first retainer and a second groove formed therein for receiving a second retainer, said thrust bulkhead being axially aligned and secured within the transmission housing by the first and second retainers.

10. The automatic transmission of claim 9 wherein the first groove has a radially tapered surface and the first retainer has a radially tapered face which cooperates with the radially tapered surface to axially bias the thrust bulkhead toward the second retainer.

11. A vehicular automatic transmission comprising:

a transmission housing;

an input shaft rotatably supported in the transmission housing;

an output shaft rotatably supported in the transmission housing;

a planetary gear assembly selectively coupled between the input shaft and the output shaft;

a clutch assembly having a first clutch hub driven by the input shaft and operable to selectively engage the planetary gear assembly for driving the output shaft at a drive ratio;

a first thrust bearing assembly operably disposed between the planetary gear assembly and the first clutch hub such that an axial thrust load generated by the planetary gear assembly is transmitted through the first thrust bearing assembly to the first clutch hub;

a thrust bulkhead secured to the transmission housing and extending radially inwardly therefrom;

a second thrust bearing assembly operably disposed between the first clutch hub and a first annular surface being formed on a first face of the thrust bulkhead such that the axial thrust load generated by the planetary gear assembly is transmitted through the clutch hub to the thrust bulkhead;

a third thrust bearing assembly operably disposed between a second annular bearing surface formed on a second face of the thrust bulkhead opposite the first face and a second clutch hub operably coupled to the first clutch hub, a clearance being provided between the second annular bearing surface and the third thrust bearing assembly such that the thrust bulkhead engages the third thrust bearing assembly only when the axial thrust load generated by the planetary gear assembly exceeds a given load.

12. The automatic transmission of claim 11 wherein the transmission housing has a first groove formed therein for receiving a first retainer and a second groove formed therein for receiving a second retainer, said thrust bulkhead being axially aligned within and secured to the transmission housing by the first and second retainers.

13. The automatic transmission of claim 12 wherein the first groove has a radially tapered surface and the first retainer has a radially tapered face which cooperates with the radially tapered surface to axially bias the thrust bulkhead toward the second retainer.

14. The automatic transmission of claim 11 wherein the clutch assembly further comprises a clutch mechanism disposed within an annular groove formed in the thrust bulkhead and operable to selectively couple the first clutch hub to the thrust bulkhead.

15. An vehicular automatic transmission comprising:

a transmission housing having a first annular groove and a second annular groove formed therein;

an input shaft rotatably supported in the transmission housing;

an output shaft rotatably supported in the transmission housing;

a planetary gear assembly selectively coupled between the input shaft and the output shaft;

a clutch assembly including a first clutch hub and a second clutch hub operably coupled to the first clutch hub, the clutch assembly operable to selectively engage the planetary gear assembly for driving the output shaft at a drive ratio;

a first thrust bearing assembly operably disposed between the planetary gear assembly and the first clutch hub such that an axial thrust load generated by the planetary gear assembly is transmitted through the first thrust bearing assembly to the first clutch hub;

a clutch retainer assembly including a thrust bulkhead extending radially inwardly between the first clutch hub and the second clutch hub, a first retainer disposed in the first groove and a second retainer disposed in the second groove, said first and second retainers axially aligning and fixedly securing the thrust bulkhead within the transmission housing;

a second thrust bearing assembly operably disposed between the first clutch hub and a first annular bearing surface formed on a first face of the thrust bulkhead such that the axial thrust load generated by the planetary gear assembly is transmitted through the first clutch hub to the thrust bulkhead;

a third thrust bearing assembly operably disposed between a second annular bearing surface formed on a second face of the thrust bulkhead opposite the first face and a second clutch hub, a clearance being provided between the second annular bearing surface and the third thrust bearing assembly such that the thrust bulkhead engages the third thrust bearing assembly only when the axial thrust load generated by the planetary gear assembly exceeds a given load.

16. The automatic transmission of claim 15 wherein the clutch assembly further comprises a first clutch mechanism disposed within a first annular groove formed in the thrust bulkhead, the first clutch mechanism being operable to selectively couple the first clutch hub to the thrust bulkhead.

17. The automatic transmission of claim 16 wherein the clutch assembly further comprises a second clutch mechanism disposed within a second annular groove formed in the thrust bulkhead, the second clutch mechanism being operable to selectively couple a member of the planetary gear assembly to the transmission housing.

* * * * *